United States Patent [19]

Kondo

[11] 4,139,792
[45] Feb. 13, 1979

[54] HIGH VOLTAGE GENERATING DEVICE

[75] Inventor: Kaneichi Kondo, Settsu, Japan

[73] Assignee: Matsushita Electric Industrial Co., Ltd., Osaka, Japan

[21] Appl. No.: 860,997

[22] Filed: Dec. 15, 1977

Related U.S. Application Data

[63] Continuation of Ser. No. 695,401, Jun. 14, 1976.

[30] Foreign Application Priority Data

| Jun. 19, 1975 | [JP] | Japan | 50-84352 |
| Apr. 20, 1976 | [JP] | Japan | 51-49741 |
| Jun. 20, 1975 | [JP] | Japan | 50-85489 |
| May 19, 1976 | [JP] | Japan | 51-64503 |

[51] Int. Cl.² .................................. H01L 41/10
[52] U.S. Cl. ................................ 310/339; 361/260
[58] Field of Search ..................... 310/339; 361/260

[56] References Cited

U.S. PATENT DOCUMENTS

| 3,114,059 | 12/1963 | Hufferd et al. | 310/339 X |
| 3,449,637 | 6/1969 | Suzuki | 310/339 X |
| 3,457,461 | 7/1969 | Steinke et al. | 361/260 |
| 3,509,388 | 4/1970 | Mifune et al. | 310/339 |
| 3,729,639 | 4/1973 | Heinouchi et al. | 310/339 |
| 3,866,069 | 2/1975 | Ishii et al. | 310/339 |
| 3,867,653 | 2/1975 | Duetze | 310/339 |
| 3,949,248 | 4/1976 | Duffner et al. | 310/339 |
| 3,963,411 | 6/1976 | Challet | 310/339 X |

Primary Examiner—Mark O. Budd
Attorney, Agent, or Firm—Stevens, Davis, Miller & Mosher

[57] ABSTRACT

A high voltage generating device comprises an outer housing in which an abutment, a piezoelectric element and a receptacle member are housed, an inner housing slidably supported in a space within the outer housing and a hammer supported within the inner housing, said abutment being struck by said hammer to generate a high voltage. An inner peripheral surface of the outer housing is formed with a cam which is adapted to engage with and disengage from a pin mounted on the hammer in order to prevent impact noise generated when the abutment is struck from leaking outside the outer housing, whereby the high voltage generating device which generates small impact noise and which is protected from the entrance of dust is provided.

10 Claims, 10 Drawing Figures

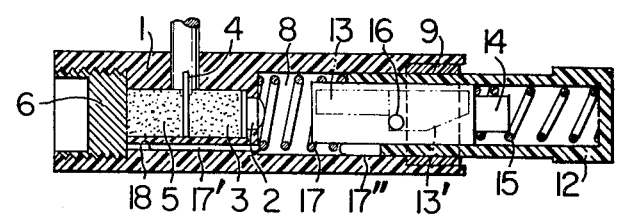
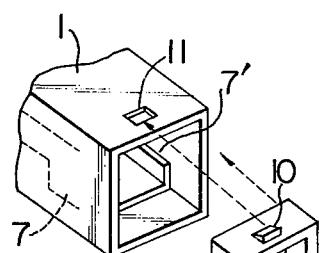
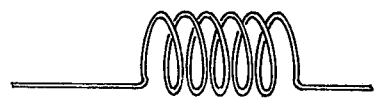
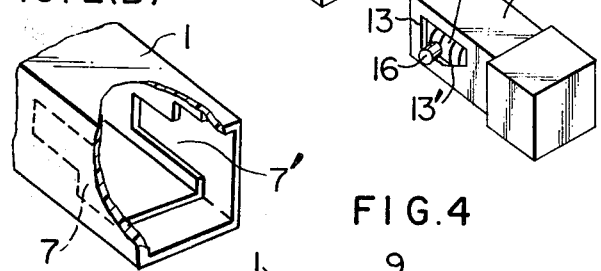
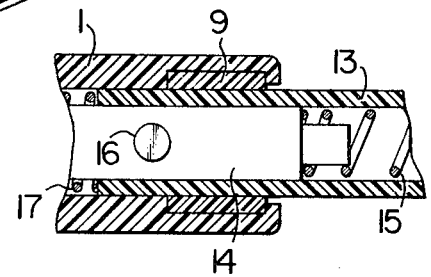

HIGH VOLTAGE GENERATING DEVICE

This is a continuation of application Ser. No. 695,401 filed June 14, 1976.

The present invention relates to a high voltage generating device for generating a high voltage by applying an impact force to a piezoelectric element.

It is an object of the present invention to provide a high voltage generating device which generates small impact noise when a piezoelectric element is struck by a hammer and which is protected from the entrance of dust.

It is a second object of the present invention to provide a simple structure for connecting a piezoelectric element with a receptacle member, which has been a problem encountered when a case for housing the piezoelectric element was made of an insulating material.

The above and other objects, features and advantages of the present invention will become more apparent from the following description of the preferred embodiments of the invention when taken in conjunction with the accompanying drawings, in which:

FIGS. 1 and 2A, 2B illustrate an embodiment of the present invention, in sectional view and in perspective view, respectively.

FIG. 3 shows a part of the embodiment.

FIG. 4 illustrates another embodiment.

Figure 5:
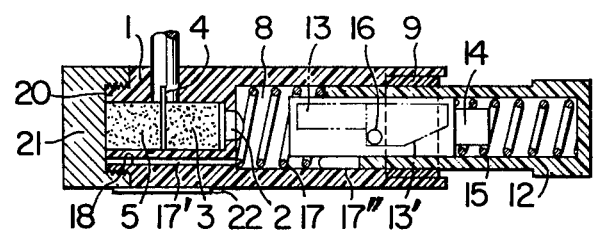
FIGS. 5 through 9 show further embodiments.

Referring now to FIGS. 1 and 2 (A, B), one embodiment of the present invention is explained. In FIGS. 1 and 2, an outer housing 1 made of an insulating material such as resin has a bore formed therein, in which bore an abutment 2, a piezoelectric element 3, a center terminal board 4 and a piezoelectric element 5 are mounted in this order and blocked by a receptacle member 6. L-shaped grooves 7, 7' are formed in inner side walls of the outer housing 1 with the grooves 7, 7' being open at the open end of the outer housing 1. A frame 9 is fitted into the outer housing 1. The frame 9 is formed with a projection 10 which is adapted to engage a hole 11 formed in the outer housing 1 to lock the frame 9 to the outer housing 1. The open areas of the grooves 7, 7' formed on the inner walls of the outer housing 1 are closed by the sides of the frame 9 to form L-shaped cam grooves. An inner housing 12 is formed with a bore 13 having a side slope 13', and it is made of an insulating material such as resin, or a conductive material. Housed in the inner housing 12 are a hammer 14 and a spring 15 for imparting a return force to the hammer 14. A pin 16 is mounted on the hammer 14 to extend beyond to bore 13. The inner housing 12 extends through the frame 9 and it is slidably supported by the outer housing 1 with the pin 16 being fitted in the cam grooves 7, 7'. A spring 17 is mounted in a space 8 within the outer housing 1. The opposite ends 17', 17" of the spring 17 are shaped to align with the axial line of the spring 17 (see FIG. 3, and one end 17' of the spring 17 is inserted into a hole 18 formed in the outer housing 1 and the tip end thereof makes contact with the receptacle member 6. The other end 17" of the spring 17 continuously contacts with the side of the hammer 14. While the inner housing 12 is biased outward by the spring 17, the outward movement thereof is limited because the pin 16 abuts against the end surfaces of the frame 9.

In FIG. 1, when the inner housing 12 is urged toward the outer housing 1 against the force of the spring 17, the spring 15 is compressed. As the inner housing 12 is further urged, the pin 16 slides on the slope 13 so that the pin 16 is disengaged from the side walls of the grooves 7, 7'. As a result, the hammer 14 abruptly moves leftward by the force of the spring 15 to strike the abutment 2 for causing the piezoelectric elements 3, 5 to generate a high voltage. When the abutment 2 is struck by the hammer 14, the abutment 2 is connected to the receptacle member 6 through the hammer 14 and the spring 17.

In the present embodiment, the outer housing 1 is made of insulating material such as resin and the sides of the outer housing 1 are not formed with L-shaped bores but the inner side walls of the outer housing 1 are formed with L-shaped grooves 7 and 7'. Accordingly, a noise generated when the hammer 14 strikes the abutment 2 does not leak outside the outer housing 1 and hence the impact noise can be reduced. Furthermore, in the present embodiment, since the frame 9 is fitted into and affixed to the outer housing 1 so that the end surfaces of the frame 9 form the side walls of the L-shaped grooves 7, 7', the manufacture of the outer housing 1 is facilitated.

As will be apparent from the foregoing, FIG. 1 is a side sectional view showing one side of the assemblage comprising the inner housing and outer housings, the two L-shaped grooves are formed on the inside opposite walls of the inner housing 12 respectively in such a relation that they are angularly rotated by 180 degrees to each other (as shown in FIGS. 2A and 2B), they are accordingly provided in practice two projections of the pin 16 and two bores 13 in place respectively on the hammer 14 and on the inner housing so that the two projections of the pin 16 engage and cooperate with the respective L-shaped grooves through the respective bores. FIG. 2A shows one side of pin and bore of them.

FIG. 4 shows another embodiment of the present invention. While the previous embodiment engages the projection 10 with the hole 11 to lock the frame 9 to the outer housing 1, the embodiment of FIG. 4 bends the end of the outer housing 1 inward to lock the frame 9 to the outer housing 1.

FIG. 5 shows other embodiment of the present invention, in which the same parts as in FIG. 1 bear the same refurence numerals. In FIG. 5, a projection 20 is formed at the end of the outer housing 1, the outer peripheral surface of the projection 20 being threaded. A receptacle member 21 has a depression formed at one end surface thereof, the inner peripheral surface of the depression being threaded. By thread coupling the receptacle member 21 to the projection 20 of the outer housing 1, the receptacle member 21 is fixed to the end of the outer housing 1. Under this mounting condition, the end surface of the piezoelectric element 4' contacts with the receptacle member 21. A conductive coating 22 is applied on the outer peripheral surfaces of the receptacle member 21 and the outer housing 1.

Figure 7:
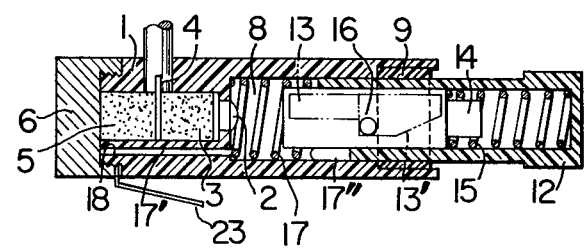

FIG. 7 shows a further embodiment of the present invention, in which a conductive plate 23 has its one end sandwiched by the receptacle member 6 and the outer housing 1.

The embodiments of FIGS. 5 and 7 provide an advantage that the present high voltage generating device can be readily grounded by merely housing the same in a metal case such as a cigaret lighter while making the receptacle member 21 contact with the metal case. Furthermore, in FIG. 5, the conductive coating 22 is applied on the outer peripheral surfaces of the receptacle member 21 and the outer housing 1 made of the insulating material such as resin, and in FIG. 7, the conductive plate 23 is provided. Accordingly, the device can be positively grounded by making the conductive coating 22 or the conductive plate 23 to contact with the metal case.

Figure 6:
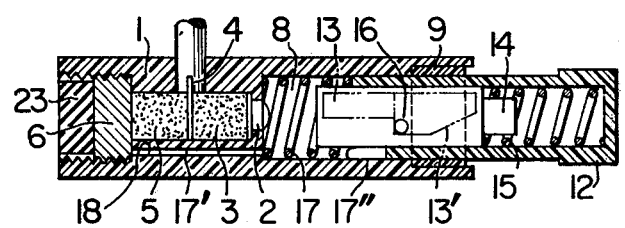

FIG. 6 shows other embodiment of the present invention. The difference from the embodiment of FIG. 1 is the inclusion of an elastic material such as rubber in a space behind the receptacle member 6. According to the present embodiment, when the abutment 2 is struck by the hammer, the impact transmitted through the abutments 2, the piezoelectric element 3, the center terminal board 4, the piezoelectric element 5 and the receptacle member 6 is absorbed by the elastic member 23 to further reduce the impact noise.

As is apparent from the above embodiments, according to the present invention, the outer housing for housing the piezoelectric elements is formed by the insulating material such as resin and the cam grooves are formed in the inner wall of the outer housing. Accordingly, the impact noise generated when the abutment is struck by the hammer does not leak outside the housing and hence the impact noise can be reduced. Furthermore, according to the present invention, one end of the piezoelectric element and the receptacle member are electrically connected together through the spring which biases the inner housing outward of the outer housing, and the hammer. In this manner, the connection of the one end of the piezoelectric element with the receptacle member, which has been a problem encountered in the outer housing made of the insulating material, is attained without necessiating additional parts.

Figure 8:
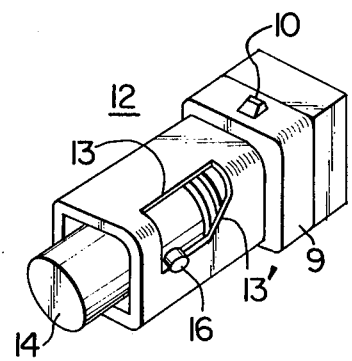
Figure 9:
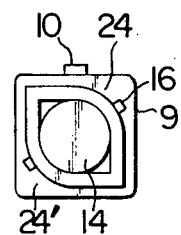

FIGS. 8 and 9 show an inner housing in a further embodiment, in which the inner housing 12 is shaped to present a square tube, in section, with two diagonally opposing corners being shaped in arcuated shape. A pin 16 projects beyond a hole 13 formed in the side of the inner housing 12 so that tip ends of the pin 16 are located on the arcuate corners 24, 24'. According to the present embodiment, the diameter of the square tubular outer housing 1 for slidably supporting the inner housing 12 can be reduced compared with the case where a square tubular inner housing is used, and hence the size of the entire structure can be reduced.

What is claimed is:

1. A high voltage generating device comprising an outer housing of insulating material in which two piezoelectric elements are housed; an electrical contact element mounted between and in contact with respective first end surfaces of said piezoelectric elements; a metal abutment and a metal receptacle member provided in said outer housing in contact with respective second end surfaces of said piezoelectric elements; an inner housing supporting an electrically conductive hammer for imparting an impact force to said metal abutment, said inner housing being slidably supported in a space within said outer housing and containing a bore with sloped portion formed in a side surface thereof; an electrically conductive spring in electrical contact with said hammer and mounted in said outer housing for biasing said inner housing outward of said outer housing, said spring having an end portion which is straight and in parallel with the longitudinal axis of said spring, said straight end portion passing through a hole in said outer housing and making electrical contact with said metal receptacle member, said outer housing containing an L-shaped cam groove formed on an inner wall thereof opened to an open end of said outer housing; a frame housing an opening through which said inner housing extends fixed over the opening of said outer housing to close the opening of said L-shaped groove and to close in conjunction with said inner housing the open end of said outer housing; and a pin mounted on said hammer, a tip end of said pin passing through said bore and engaging with said L-shaped cam groove of said outer housing.

2. A high voltage generating device according to claim 1 wherein a projection is formed on an outer peripheral surface of the frame, a hole is formed near the opening of said outer housing, and said frame is fitted in said outer housing such that said projection engages said hole to lock said frame to said outer housing.

3. A high voltage generating device according to claim 1 wherein said frame is inserted into the opening end of said outer housing, and the opening end of said outer housing is bent inward to lock the frame to said outer housing.

4. A high voltage generating device according to claim 1 wherein a projection is formed at one end of said outer housing closer to said piezoelectric element, said projection being threaded on an outer peripheral surface thereof, said metal receptacle member includes a depression having an inner peripheral surface which is threaded, and said metal receptacle member is thread coupled to said projection to make said receptacle member contact with a said respective second end surface of one of said piezoelectric elements.

5. A high voltage generating device according to claim 4 wherein a conductive coating is applied on said metal receptacle member and the outer peripheral surface of said outer housing.

6. A high voltage generating device according to claim 1 wherein a hole is formed at one end of said outer housing closer to said piezoelectric element, the inner peripheral surface of said hole being threaded, and said metal receptacle member includes a threaded portion on the outer periphery thereof, whereby said metal receptacle member makes in contact with said respective end surface of one of said piezoelectric elements.

7. A high voltage generating device according to claim 6 wherein an elastic member is housed in a space within said outer housing behind said metal receptacle member.

8. A high voltage generating device according to claim 4 wherein a grounding conductive plate is provided, one end of said conductive plate being sandwiched by said metal receptacle member and said outer housing.

9. A high voltage generating device according to claim 1 wherein said inner housing supporting said hammer is shaped to present a square tube in section with two diagonally oppositng corners being shaped in arcuate shape, and said pin mounted on said hammer extends through the hole of said inner housing to be positioned at said arcuate corners.

10. A high voltage generating device comprising an outer housing of insulating material in which two piezoelectric elements are housed; an electrical contact element mounted between and in contact with respective first end surfaces of said piezoelectric elements; a metal abutment and a metal receptacle member provided in said outer housing in contact with respective second end surfaces of said piezoelectric elements; an inner housing supporting an electrically conductive hammer for imparting an impact force to said metal abutment, said inner housing being slidably supported in a space within said outer housing and containing a bore with a sloped portion formed in a side surface thereof; an electrically conductive spring in electrical contact with said hammer and mounted in said outer housing for biasing said inner housing outward of said outer housing, said spring having an end portion which is straight and in parallel with the longitudinal axis of said spring, said straight end portion passing through a hole in said outer housing and making electrical contact with said metal receptacle member; said outer housing containing an L-shaped cam groove on an interior surface thereof; and a pin mounted on said hammer, a tip end of said pin passing through said bore and engaging with said L-shaped cam groove of said outer housing.

* * * * *